(12) United States Patent
Rogers

(10) Patent No.: US 11,976,780 B2
(45) Date of Patent: May 7, 2024

(54) GRIP STRAP MAGNETIC MOUNTING DEVICE

(71) Applicant: Russell Thomas Rogers, Columbus, OH (US)

(72) Inventor: Russell Thomas Rogers, Columbus, OH (US)

( * ) Notice: Subject to any disclaimer, the term of this patent is extended or adjusted under 35 U.S.C. 154(b) by 408 days.

(21) Appl. No.: 17/336,812

(22) Filed: Jun. 2, 2021

(65) Prior Publication Data

US 2022/0390064 A1 Dec. 8, 2022

(51) Int. Cl.
*F16M 13/02* (2006.01)
*F16B 2/00* (2006.01)

(52) U.S. Cl.
CPC ............. *F16M 13/022* (2013.01); *F16B 2/00* (2013.01)

(58) Field of Classification Search
CPC ........ F16M 13/022; F16B 2/08; F16B 45/024
USPC ....................... 248/205.1; 24/68 R
See application file for complete search history.

(56) References Cited

U.S. PATENT DOCUMENTS

| | | | |
|---|---|---|---|
| 5,887,774 A | 3/1999 | Bethune | |
| 6,843,456 B1 | 1/2005 | Hajianpour | |
| 10,626,898 B1 * | 4/2020 | Cleveland | F16B 2/08 |
| 2007/0017924 A1 | 1/2007 | Hundley | |
| 2008/0210586 A1 * | 9/2008 | Didio | G09F 3/14 |
| | | | 206/457 |

OTHER PUBLICATIONS

Wadowsky, Lauren, This magnetic bottle holder strap keeps your water bottle off the ground, blog post on The Gadget Flow.com, Jul. 6, 2020, 5 pages.
amazon.com, Fidlock Twist Bottle 45 & Uni Base Set-Bike Water Bottle Holder with No. Screws & Attached Bottle—Cage Free Magnetic Rack—Smoke, screen shot of webpage, accessed May 5, 2021, 15 pages.
amazon.com, Twist Bottle 600 & Uni Base Set—Bike Water Bottle Holder with No. Screws & Attached Bottle—Cage Free Magnetic Rack—Clear, screen shot of webpage, accessed May 5, 2021, 12 pages.
amazon.com, Optimum Technologies Rug Gripper Nonslip Rug Tape, screen shot of webpage, accessed May 10, 2021, 9 pages.
amazon.com, Wilderness Systems Magna Tech Water Bottle Strap—Magnetic Drink Holder—Universal—Adjustable Bottle Strap, Orange 5" Bottle Strap, screen shot of webpage, accessed May 5, 2021, 7 pages.
amazon.com, GYM ADKT Magnetic Water Bottle Holder: Two Super Strong Military Grade Magnets Built in to Hold Up to 40oz, screen shot of webpage, accessed May 5, 2021, 11 pages.
amazon.com, AFIXT Magnetic Water Bottle Holder with Adjustable Elastic Sleeve to Fit Many Shapes and Sizes, screen shot of webpage, accessed May 5, 2021, 14 pages.

* cited by examiner

*Primary Examiner* — Todd M Epps
(74) *Attorney, Agent, or Firm* — Standley Law Group LLP; James L. Kwak; Bryan P. Finneran

(57) ABSTRACT

A grip strap magnetic mounting device for supporting objects such as water bottles within a strap. The device is configured to magnetically connect to various metallic surfaces, including surfaces of exercise equipment. The strap is connected to a magnet. The strap includes a grip portion for preventing an object from slipping out of the strap. The strap is configured to maintain a bottle in an upright position regardless of magnet orientation.

19 Claims, 9 Drawing Sheets

GRIP STRAP MAGNETIC MOUNTING DEVICE

TECHNICAL FIELD

Exemplary embodiments of the present invention relate to a grip strap magnetic mounting device. Specifically, exemplary embodiments of the present invention relate to a device configured to magnetically connect to metallic surfaces of exercise equipment, the device including a strap having grip material for supporting a fluid container.

BACKGROUND AND SUMMARY

Fluid consumption is of particular importance to individuals engaged in physical activity. A lack of fluid consumption by an individual before, during or after certain physical activity may cause that individual to suffer from dehydration or related health issues. A user of a fitness facility may often bring at least one fluid container to the fitness facility to provide the user a source of fluids for hydration. Traditionally, the user would place the at least one fluid container, or other item or object, on a floor or related surface of a fitness facility when the user was engaged in certain physical activity. Pathogens and/or other contaminants are generally present on the floor or related surface. Thus, at least some pathogens and/or other contaminants would generally be transferred from the floor or related surface to the at least one fluid container (example of "container contamination") by way of physical contact between the container with the floor or related surface. The pathogens and/or other contaminants may thereafter be transferred from the container, or other item or object, to other surfaces, including by way of example and not limitation, a user's hands, face, car upholstery, gym bag, or the like.

Furthermore, placement of the at least one fluid container on the floor or related surface may present an obstacle to certain physical activity and/or may prevent a user from engaging in physical activity in close proximity to the fluid container out of concern that the user may strike the fluid container or trip over the fluid container (examples of "obstacle issues"). A user may suffer certain harm or injury from tripping over a fluid container. Additionally, placement of the at least one fluid container on a floor or similar surface may cause the user to accidentally strike the at least one fluid container, such as, for example, by accidentally walking into the at least one fluid container and inadvertently kicking over the container, causing contents of the container to spill from the container onto the floor or related surfaces of the fitness facility (example of "spill issues"). In addition, where the at least one fluid container is positioned on a floor when the user is engaged in physical activity, the user must bend over to pick up the at least one fluid container each time the user wishes to drink from the container (example of "unnecessary effort issues").

Known fluid container/bottle mounting devices ("known devices" or "prior devices" or "traditional devices") have been developed to permit fitness facility users to mount fluid containers on certain surfaces of certain exercise equipment. Specifically, traditional devices may be configured to suspend a fluid container away from a floor and/or related surfaces, including but not limited to surfaces potentially contacted by a user during a workout. Traditional devices may further be configured to cause an axis of the fluid container (a line from the center of a container opening to the center of a container base) to be approximately parallel to a surface face of the surface the known device is attached to, preventing the container from spilling when the surface face is a vertical surface face (a surface face extending approximately perpendicular to a floor). Certain prior devices may include one or more magnets for establishing physical attachment between the prior device and the surface face. Traditional devices may also be configured to attach to the surface face at various heights, permitting a user to access a fluid container therein without having to bend over each time the user wishes to drink from the container. Thus, traditional devices may solve certain container contamination issues, certain obstacle issues, certain spill issues, and certain unnecessary effort issues.

However, with traditional devices, several issues are present related to a lack of at least the following: (1) user ability to access the fluid container without having to remove the container from the prior device ("access issues"); (2) user ability to attach the prior device to any number of metallic surfaces regardless of whether a fluid container therein is watertight ("positioning issues"); and (3) adequate gripping of the fluid container ("gripping issues").

Specifically, with prior devices having a fluid container maintained therein, the axis of the fluid container may be substantially fixed. Thus, the fluid container may not be rotated to permit the user to, for example by way of illustration and not limitation, pour water from the container onto a towel or drink from the container, unless the user has first removed the container from the prior device.

Furthermore, with prior devices having a fluid container maintained therein, the axis of the fluid container may necessarily be approximately parallel to a surface face of the surface the prior device is attached to. For example, by way of illustration and not limitation, certain prior devices include a bottle strap attached to a magnet, where the prior bottle strap is stationary with respect to the prior magnet. The prior magnet may be attached to a surface face extending substantially parallel to a floor, but as a result, the axis of the fluid container engaged by the prior bottle strap would also be substantially parallel to the floor, causing fluid contents therein to spill out if the container is not watertight. Thus, users lack the ability to attach prior devices to any number of metallic surfaces regardless of whether the fluid container therein is watertight.

Additionally, with prior devices, moisture including by way of example and not limitation, condensation and/or sweat from a user's hands, may cause a fluid container engaged by the prior device to partially or entirely slip out of the prior device as a result of reduced friction between the container and the device. The position of the fluid container may also change as a result of variable levels of fluid within the container. Certain prior devices have addressed the issue of inadequate gripping by introducing immobilization mechanisms for specific bottles to be used with the devices. For example, by way of illustration and not limitation, the "TWIST Bottle 600" by Fidlock" includes a specific bottle configured to lock in place when recess lock members of the bottle are engaged by protrusion lock members of a device attached to a beam. However, prior devices fail to offer a solution where any number of different fluid containers may be adequately immobilized within a fluid container mounting device regardless of moisture presence on and/or variable fluid levels within the containers.

In view of the foregoing, a mounting device which may be useful for mounting fluid containers, and alternatives to prior devices including traditional magnetic mounting devices for fluid containers are needed to improve efficiency in collectively preventing container contamination, obstacle issues, spill issues, unnecessary effort issues, in addition to access issues, positioning issues, and gripping issues.

It is an exemplary objective of the present invention to provide a grip strap magnetic mounting device.

With the above object in view, the present invention discloses a grip strap magnetic mounting device. Exemplary grip strap magnetic mounting devices are configured to suspend one of any number of different containers at any number of heights above a ground surface or floor by magnetic attachment of the exemplary devices to a metallic surface, such as but not limited to a surface face of an exercise rack.

The magnetic mounting device may specifically include at least one strap comprising at least one grip portion or gripping feature for supporting or immobilizing a container, including by way of example and not limitation a water bottle used as a source of hydration for a fitness facility user. The at least one strap may be linked to at least one magnet by, by way of example and not limitation, at least one ring, clip, carabiner, or the like (collectively or independently, "linking member(s)"). The at least one magnet may be configured to support at least 30 pounds. In preferred embodiments, the at least one magnet is configured to support at least 45 pounds. At least one linking member may be engaged in and configured to slide about and rotate within each of at least one aperture of the at least one magnet and at least one aperture of the at least one strap. As a result, the at least one strap and the at least one magnet may be configured to move or rotate with respect to the other regardless of whether the other has been immobilized.

For example, by way of illustration and not limitation, a water bottle, whether or not watertight, may be positioned within the at least one strap. The at least one magnet linked to the at least one strap may be attached to any number of vertical, horizontal, or diagonal metallic surfaces, so long as the length of the surface(s) exceed(s) the diameter of the at least one magnet. By way of illustration and not limitation, the at least one magnet may be mounted by a user to a horizontal surface (surface substantially parallel to the floor) of a steel exercise rack beam. The at least one linking member may slide through and/or rotate within apertures to permit the force of gravity to cause the water bottle to be maintained in an upright position (an axis of the container is maintained within a range of angles such that contents therein will not spill out, regardless of whether the container is watertight) when the bottle is not being engaged by a user. Thus, with exemplary embodiments of the present invention, users have the ability to attach the exemplary device to any number of metallic surfaces regardless of whether the fluid container therein is watertight.

The ability of the at least one ring, clip, carabiner or the like to slide through and/or rotate within apertures may further permit a user to rotate the fluid container engaged in the at least one strap without having to remove the fluid container from the at least one strap. Thus, with exemplary embodiments of the present invention, a container may be rotated when engaged by at least one strap to permit a user to, for example by way of illustration and not limitation, pour water from the container onto a towel or drink from the container, without first having to remove the container from the exemplary strap.

Exemplary embodiments of the present invention may further include at least one additional ring, clip, carabiner or the like for suspending additional items from or on the at least one strap. The at least one additional ring, clip, carabiner or the like may be disposed in an additional aperture, where the at least one additional ring, clip, carabiner or the like may be configured to slide through and/or rotate within the additional aperture. By way of illustration and not limitation, items such as car keys, towels, disinfectant wipes, headphones, cell phones or the like may be connected to or suspended from ("hanged from") or on the at least one additional ring, clip, carabiner or the like.

Exemplary straps of the present invention may further comprise a grip portion or gripping feature. The grip portion may include grip mesh comprising a grid pattern of threads, strands, or the like, where the threads, strands or the like may comprise polypropylene with a small amount of non-residual adhesive applied thereto. In other embodiments, the threads, strands or the like may comprise silicon. The grip mesh may be positioned in front of exemplary strap fabric, and portions of the grip mesh may be sewn, stitched, seamed, glued, or the like to the exemplary strap fabric.

Exemplary straps may additionally comprise at least two connecting portions, and at least one support portion. In certain preferred embodiments, the at least two connecting portions connect to one another by hook-and-loop fastening to cause an exemplary strap to close around a container and hold the container in place. A user may place one of any number of containers within an exemplary strap, and the user may tighten or otherwise increase tension in the strap to cause a grip portion of the strap to support and immobilize the container. In exemplary embodiments of the present invention, the grip mesh prevents the container from partially or fully sliding out of the exemplary strap.

BRIEF DESCRIPTION OF THE DRAWINGS

In addition to the features and advantages mentioned above, other features and advantages disclosed herein will become more apparent from the following detailed description of exemplary embodiments when read in conjunction with the attached drawings, wherein like reference numerals across the several views refer to identical or equivalent features, and wherein.

DETAILED DESCRIPTION

The disclosed grip strap magnet mounting device is useful for mounting fluid containers, and in preventing aforementioned issues including but not limited to container contamination, obstacle issues, spill issues, unnecessary effort issues, access issues, positioning issues, and gripping issues.

Figure 1:
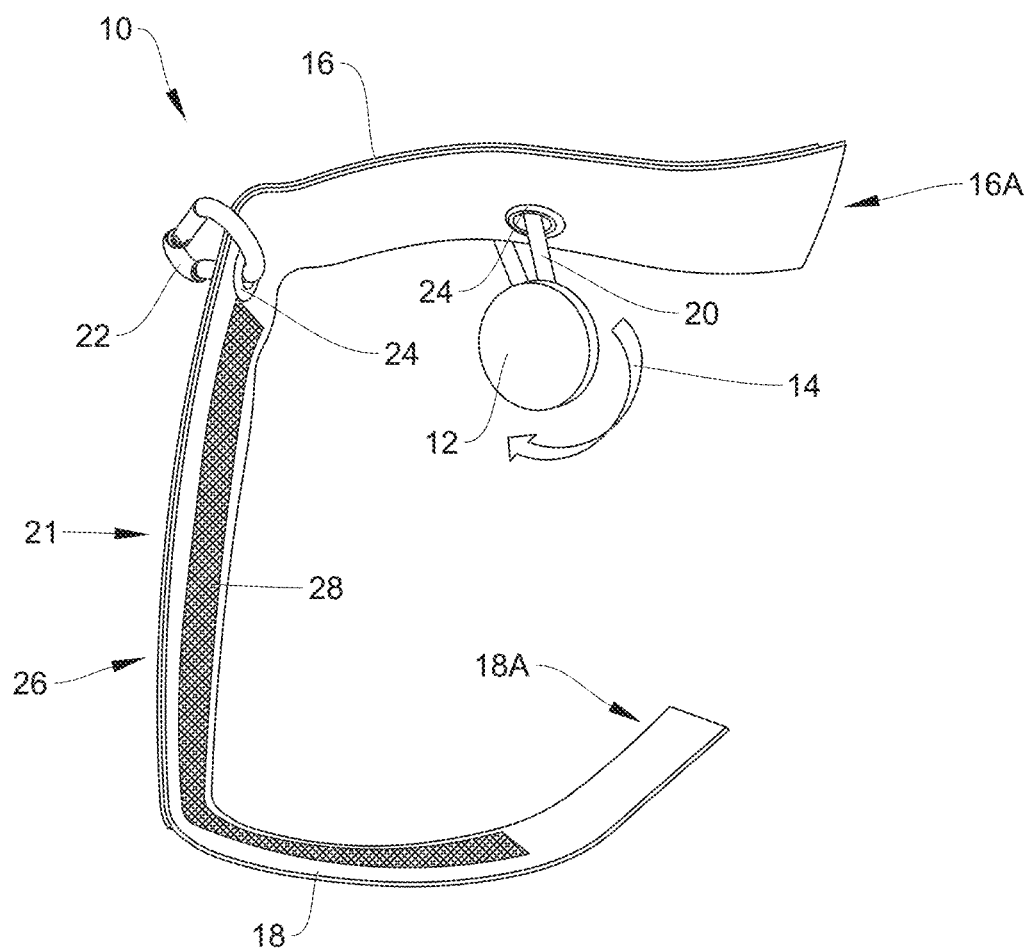
FIG. 1 is a top perspective view of an exemplary grip strap magnetic mounting device.

Referring initially to FIG. 1, an exemplary grip strap magnetic mounting device ("magnetic device") 10 is shown. The magnetic device 10 may comprise at least one magnet 12. The magnet 12 may be configured to attach to any number of metallic surfaces, including by way of illustration and not limitation, surfaces of an exercise rack or other exercise equipment. The at least one magnet 12 may be configured to support at least 30 pounds. In preferred embodiments, the at least one magnet 12 is configured to support at least 45 pounds. A first carabiner 20 may be engaged in and configured to slide through and/or rotate within each of at least one aperture (not shown) of the magnet 12 and at least one aperture 24 of an exemplary strap 21 of the magnetic device 10. As a result, the strap 21 and the magnet 12 may be configured to move or rotate with respect to one another regardless of whether the other is stationary. A potential rotation path of the magnet 12 is demonstrated by arrow 14.

The exemplary strap 21 may comprise a grip portion 28. The grip portion 28 may comprise grip mesh. The grip portion 28 may be partially disposed on a support portion 26 of the strap 21. The grip portion 28 may also be partially disposed on a first connecting portion 18 of the strap 21. It will be understood by one of ordinary skill in the art that the grip portion 28 may be positioned at any number of locations along the strap 21, and the present invention is not limited to a single grip portion having a certain length.

In the particular embodiment shown, the first connection portion 18 comprises a hook portion 18A configured to attach to a loop portion 16A of a second connection portion 16 of the strap 21 to define hook-and-loop fastening. It will be understood by one of ordinary skill in the art that the present invention is not intended to be limited to a first connection portion attaching to a second connection portion by hook-and-loop fastening. There may any number of ways to connect at least two connection portions of an exemplary strap, including by way of illustration and not limitation, magnetic attachment, key ring attachment, thread attachment, carabiner attachment, strap attachment, metal eyelet attachment, or the like.

A second carabiner 22 may be engaged in and configured to slide about and rotate within each of an aperture 24 of the strap 21, and at least one ring, aperture, hole or the like of an additional item, including by way of example and not limitation a key ring of a set of car keys. It will be understood by one of ordinary skill in the art that it is not intended the present invention be limited to the use of a second carabiner disposed in an aperture to suspend other objects from or on an exemplary magnetic device. There may be any number of ways to suspend other objects from or on exemplary magnetic devices.

Figure 2:
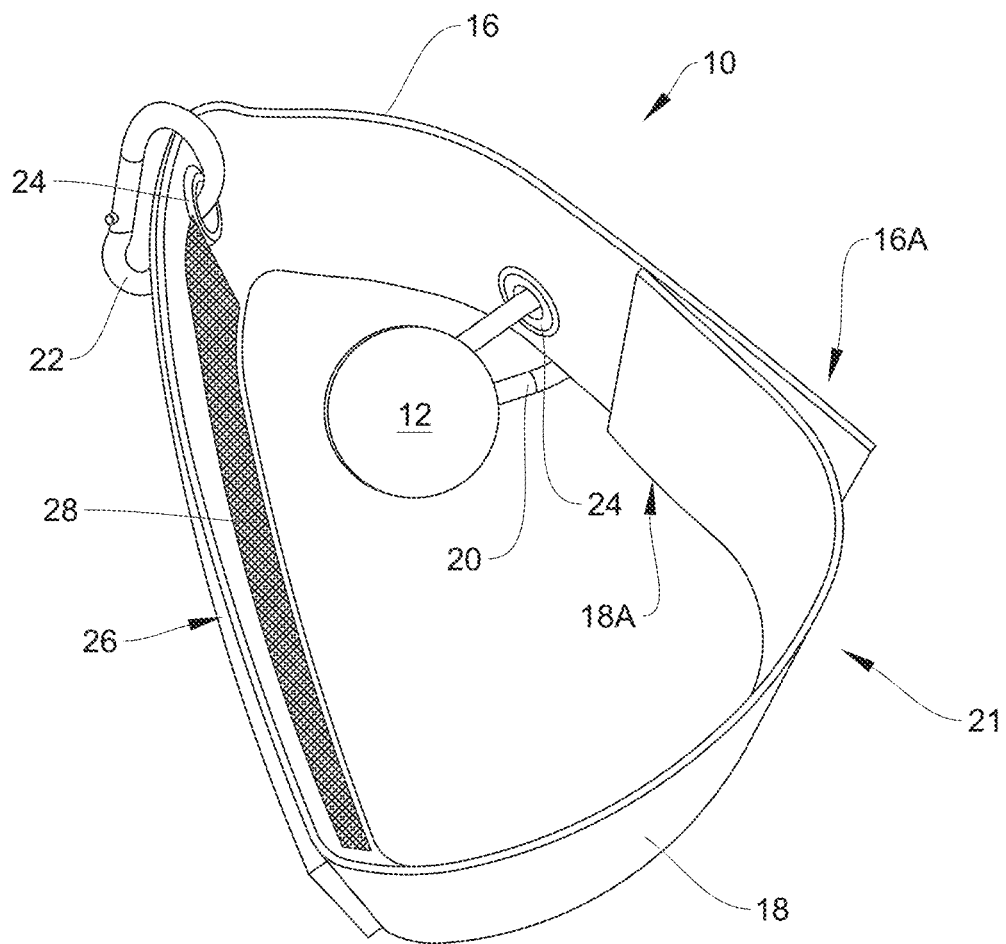
FIG. 2 is another perspective view of the FIG. 1 embodiment.

FIG. 2 shows the exemplary magnetic device 10 of the FIG. 1 embodiment where the hook portion 18A of the first connection portion 18 is engaged with or otherwise connected to the loop portion 16A of the second connection portion 16 of the strap 21. The magnet 12 having a potential rotation path demonstrated by arrow 14 is shown, where the first carabiner 20 engaged thereto may further be engaged in an aperture 24. In the particular embodiment shown, the aperture 24 is positioned on the second connection portion 16 of the strap 21. Another aperture 24 may be positioned on the support portion 26, and a second carabiner 22 may be engaged therein.

In the particular embodiment shown, the grip portion 28 comprises grip mesh. The grip mesh may comprise a grid pattern of threads, strands, or the like, where the threads, strands or the like may comprise polypropylene with a small amount of non-residual adhesive applied thereto. In other embodiments, the threads, strands or the like may comprise silicon. The grip mesh may be positioned in front of exemplary strap fabric of the strap 21, and portions of the grip mesh may be sewn, stitched, seamed, glued, or the like to the exemplary strap fabric. A user may place one of any number of containers within the strap 21, and the user may tighten or otherwise increase tension in the strap, such as by, by way of example and not limitation, positioning the hook portion 18A further along the loop portion 16A, to cause the grip portion 28 to support the container and/or to prevent the container from sliding along the strap 21. Specifically, in exemplary embodiments of the present invention, the grip mesh, which has a high friction coefficient, prevents the container from partially or fully sliding out of the strap 21, regardless of whether moisture is present on the container and/or the strap 21.

Figure 3:
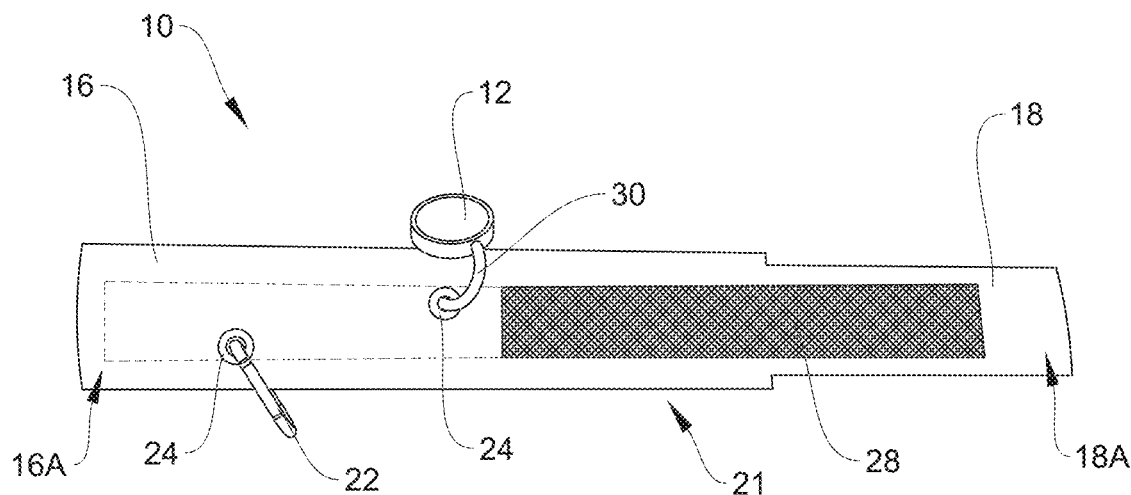
FIG. 3 is a top view of an exemplary grip strap magnetic mounting device.
Figure 4:
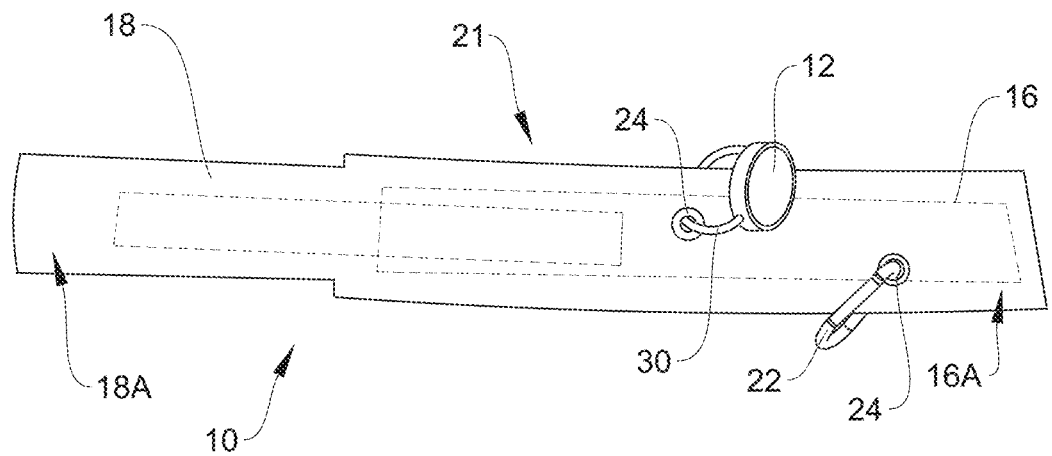
FIG. 4 is a bottom view of the FIG. 3 embodiment.

Referring now to FIGS. 3-4, another exemplary magnetic device 10 having a strap 21 comprising a first connection portion 18 having a hook portion 18A configured to attach to a loop portion 16A of a second connection portion 16 is shown. The strap 21 may further include a grip portion 28. In the particular embodiment shown, a ring 30 is engaged in and configured to slide through and/or rotate within each of at least one aperture (not shown) of a magnet 12 and at least one aperture 24 of the strap 21. A carabiner 22 for linking at least one additional item to the strap 21 is engaged in another aperture 24 of the strap 21. It will be apparent to one of ordinary skill in the art that the present invention is not limited to the use of carabiners or rings to link the magnet 12 to the strap 21 or to link at least one additional item to the strap 21. There may be any number and/or types of linking members used to link the magnet 12 to the strap 21 without sacrificing the ability of the strap 21 and the magnet 12 to move or rotate with respect to one another regardless of whether the other is stationary. There may also be any number of and/or types of apparatuses used to link at least one additional item to the strap 21.

Figure 5:
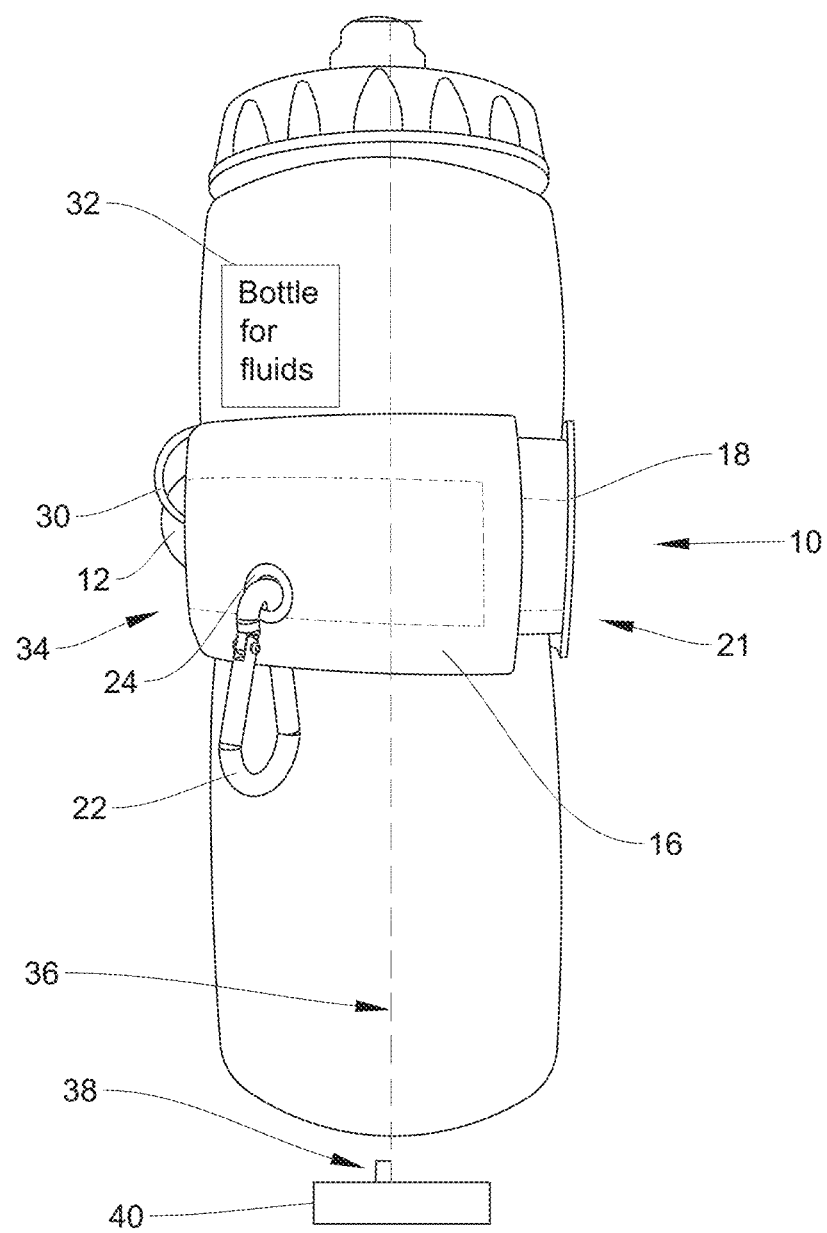
FIG. 5 is a front perspective view of a bottle for fluids engaged in an exemplary grip strap magnetic mounting device, where the device is connected to a vertical surface, and where a container axis is perpendicular to a floor.
Figure 6:
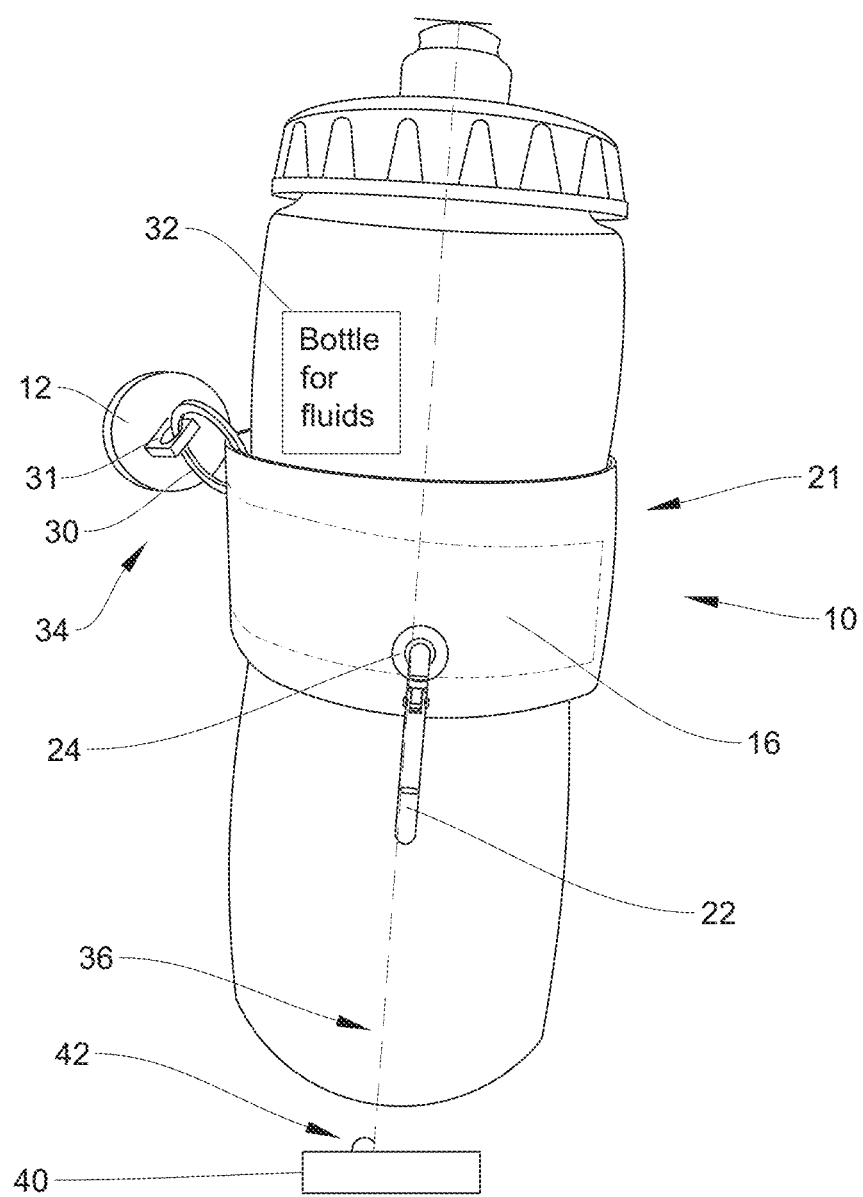
FIG. 6 is a front perspective view of the FIG. 5 embodiment, showing a container axis not perpendicular to a floor.

FIG. 5 shows a bottle for fluids 32 engaged in an exemplary grip strap magnetic mounting device 10, where the device 10 is connected by magnet 12 to a vertical surface 34, the magnet 12 is linked by ring 30 to strap 21, and where a container axis 36 is perpendicular (demonstrated by angle 38) to a floor 40. FIG. 6 shows the bottle for fluids 32 of the FIG. 5 embodiment, where the bottle 32 is engaged in the exemplary grip strap magnetic mounting device 10, where the device 10 is connected by magnet 12 to a vertical surface 34, where the magnet 12 linked by ring 30 to strap 21, and where the container axis 36 is not perpendicular (demonstrated by angle 42) to a floor 40.

Figure 7:
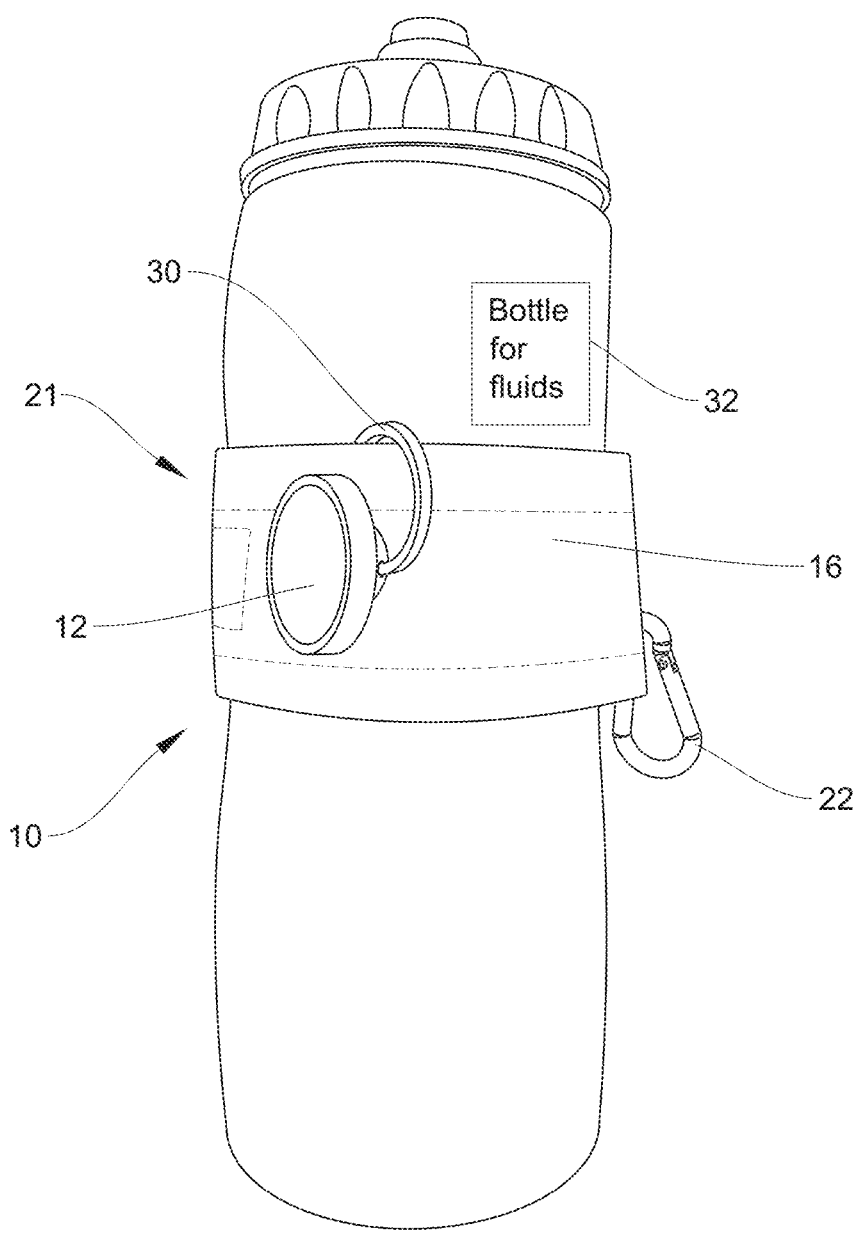
FIG. 7 shows a rear perspective view of a bottle for fluids engaged in an exemplary grip strap magnetic mounting device, where the device is not connected to a vertical surface.
Figure 8:
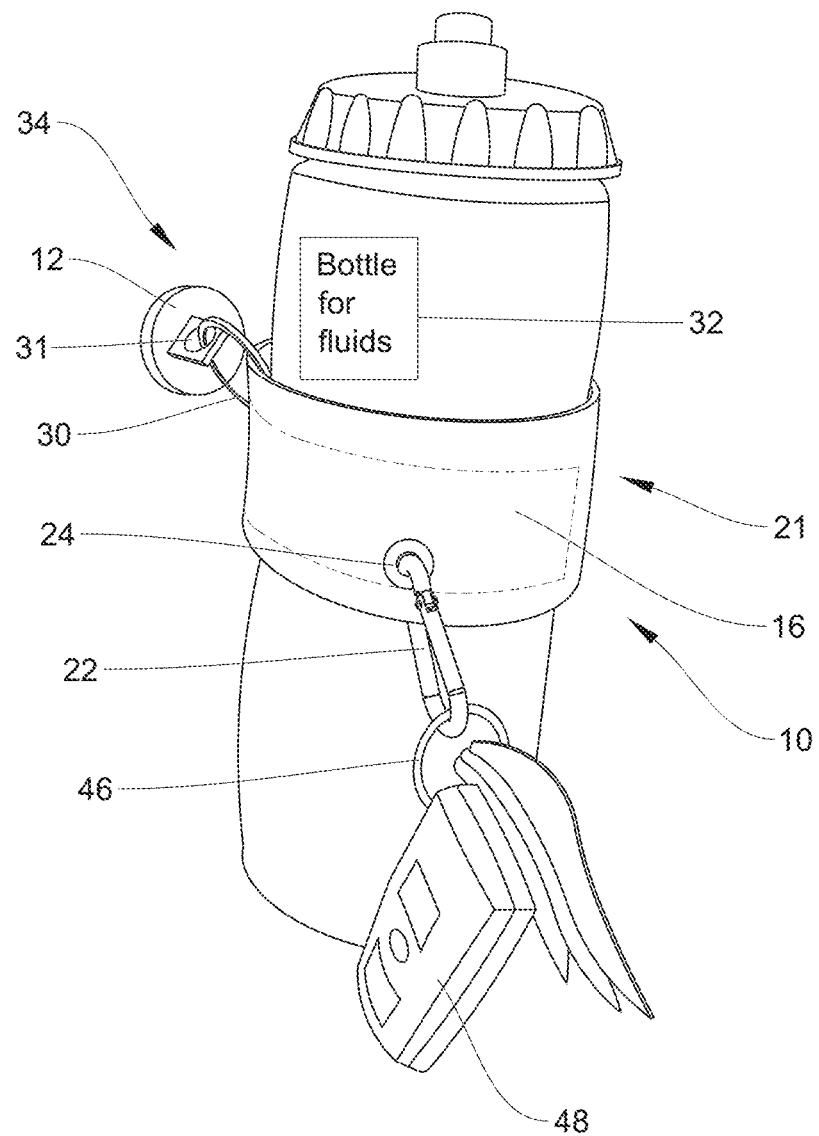
FIG. 8 is another front perspective view of the FIG. 6 embodiment, where an additional item has been attached to the exemplary device.

Referring now to FIGS. 5-8, the magnetic device 10 may be configured to suspend the bottle 32 at any number of heights above a ground surface or floor 40 by magnetic attachment of the device 10 to a metallic surface 34. In FIG. 5, first 18 and second 16 connecting portions of the strap 21 are shown. In FIGS. 6-8, the second connecting portion 16 of the strap 21 is shown. The ring 30 may be configured to slide through and/or rotate within each of an aperture 31 of magnet 12 and an aperture of the strap 21. As a result, the container axis 36 may be positioned at any number of angles with respect to the floor 40 when magnet 12 is attached to surface 34. By way of example and not limitation, a user's ability to rotate the bottle 32 when the magnet 12 is attached to the surface 34 may permit a user to pour water from the bottle 32 on a towel or drink from the bottle 32 without having to remove the bottle 32 from the device 10. It will be apparent to one of ordinary skill in the art that any number of different rings, clips, carabiners or other linking members may be used to link at least one magnet (e.g., 12) to at least one strap (e.g., 21). Exemplary rings, clips, carabiners or other linking members may come in any number of different sizes and may comprise any number of different materials for optimizing movement of the at least one strap and at least one magnet with respect to one another. It will further be apparent to one of ordinary skill in the art that the present invention is not limited to use in fitness facilities. With the present invention, any number of metallic surfaces may be used to suspend any number of different container types serving a variety of different purposes.

Furthermore, in the particular embodiments shown, a carabiner 22 engaged in an aperture 24 of the exemplary strap 21 may suspend at least one additional item on or from the device 10. Referring to FIG. 8, car keys 48 linked to a key ring 46 are hanged from the exemplary strap 21. It will be apparent to one of ordinary skill in the art that any number of different objects, including by way of illustration and not limitation a fluid container (e.g., 32), car keys (e.g., 48), hand towels, disinfecting wipes, headphones, resistance bands, or other objects a user may possess at a fitness center may be hanged on or from an exemplary device 10 away from unsanitary surfaces to prevent contamination thereof and/or to prevent the objects from causing issues including but not limited to obstacle issues, spill issues, or unnecessary effort issues. Additionally, with exemplary embodiments of the present invention, a grip strap magnetic mounting device may be used to reserve exercise equipment by indicating to other individuals that the equipment already has an intended user.

Figure 9A:
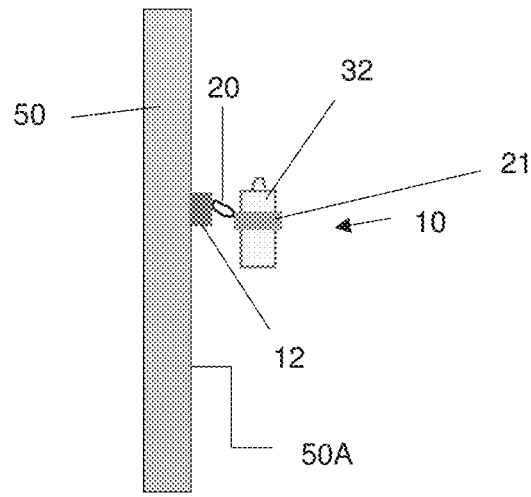
FIG. 9A is a left side view of an exemplary grip strap magnetic mounting device, where a magnet of the exemplary device is vertically oriented and magnetically connected to a vertical face of an exercise rack.
Figure 9B:
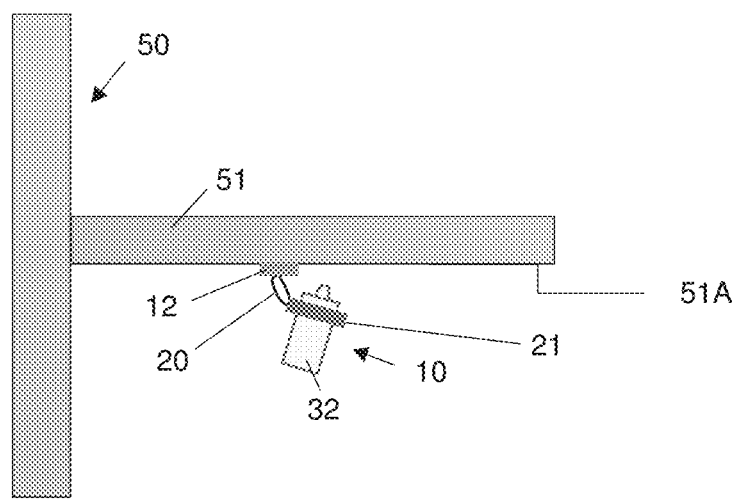
FIG. 9B is a left side view of an exemplary grip strap magnetic mounting device, where a magnet of the exemplary device is horizontally oriented and magnetically connected to a horizontal face of an exercise rack.

FIG. 9A shows an exemplary embodiment of a grip strap magnetic mounting device 10 where a bottle 32 is immobilized in a strap 21 linked to a magnet 12 by a carabiner 20. The magnet 12 may be attached to a vertical surface face 50A of an exercise rack 50. FIG. 9B shows the exemplary grip strap magnetic mounting device 10 of the FIG. 9A embodiment where the magnet 12 is attached to a horizontal surface face 51A of a beam 51 of exercise rack 50. The force of gravity acting on the mass of the bottle 32 and fluid therein may cause the bottle 32 and the strap 21 securing the bottle 32 to rotate such that the bottle 32 may be maintained in an upright position. The carabiner 20 may permit the rotation. By way of example and not limitation, the carabiner 20 may rotate within and/or move through an aperture of the strap 21 as the force gravity acts to cause the center of mass of the bottle 32 to rotate towards a floor while the magnet 12 remains stationary. By maintaining the bottle 32 in an upright position, the exemplary device 10 prevents non-watertight bottles from spilling.

Figure 10:
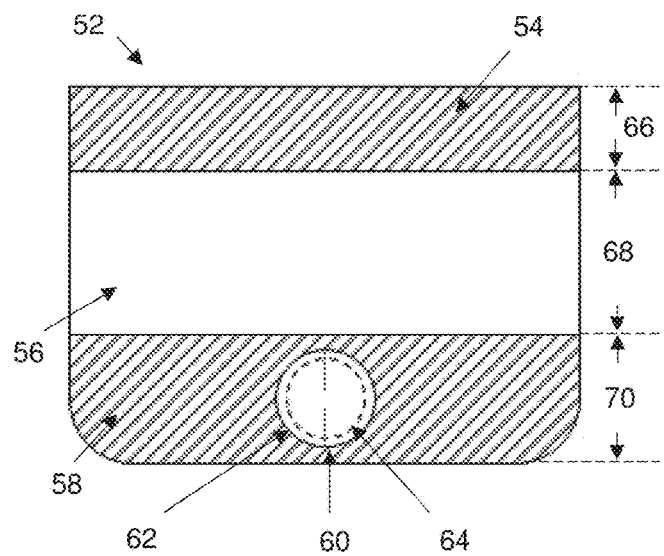
FIG. 10 is a front view of an exemplary handle accessory for an exemplary grip strap magnetic mounting device.
Figure 11:
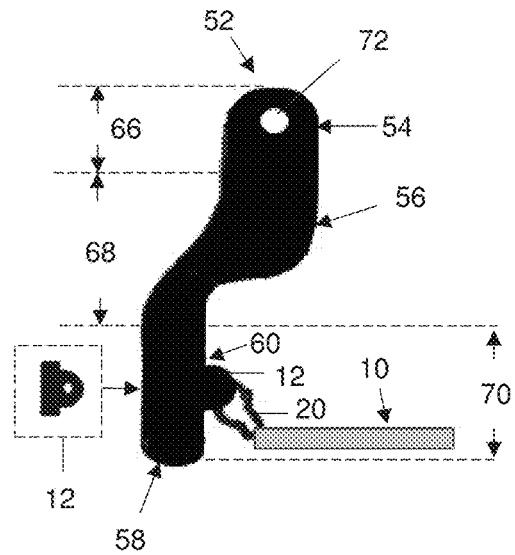
FIG. 11 is a left-side view of the FIG. 10 embodiment, where the exemplary handle accessory is magnetically connected to a grip strap magnetic mounting device comprising a magnet, carabiner, and grip strap.
Figure 12:
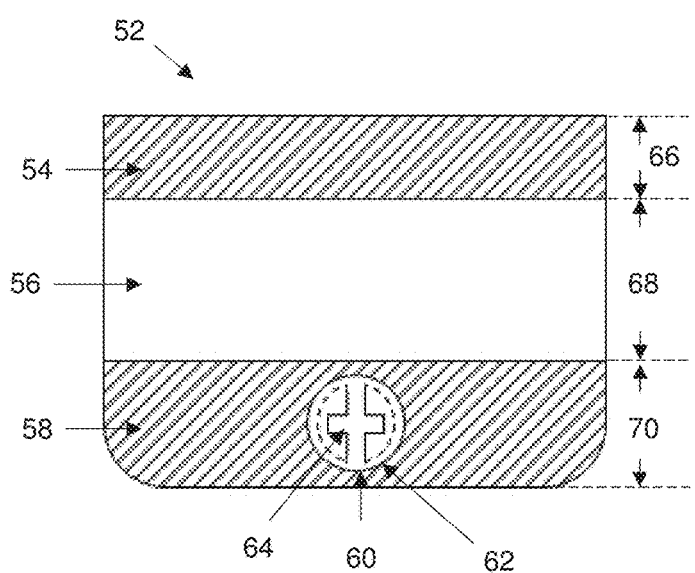
FIG. 12 is a rear view of the FIG. 10 embodiment.

Referring now to FIGS. 10-12, an exemplary handle accessory 52 having an upper section 54 of length 66, a mid-section 56 of length 68, and a lower section 58 of length 70, for an exemplary grip strap magnetic mounting device 10 is shown. The lower section 58 may include a metallic attachment member 60 having an outer portion 62 configured to attach to a magnet 12, which may be linked to a carabiner 20 or other linking member. The attachment member 60 may further include an inner portion 64 configured to immobilize the attachment member 60 within the lower section 58 of the handle accessory 52. The handle accessory 52 may permit a user to carry the attachment apparatus by gripping one or more sections 54, 56, 58 of the handle accessory 52. The handle accessory 52 may further permit a user to suspend the exemplary device 10, such as by way of example and not limitation, for storage purposes, from any number of j-hooks, hangars, protrusions, or the like, by placing the j-hook, hangar, protrusion or the like through an aperture 72 of the handle accessory 52.

While a grip strap magnetic mounting device has been described with reference to various embodiments, those skilled in the art will understand that various changes may be made, and equivalents may be substituted for elements thereof without departing from the scope and essence of the disclosure. In addition, many modifications may be made to adapt a particular situation or material to the teachings of the disclosure without departing from the essential scope thereof. Therefore, it is intended that a grip strap magnetic mounting device not be limited to the particular embodiments disclosed. All citations referred herein are expressly incorporated herein by reference.

What is claimed is:

1. A device for mounting an object comprising:
   a magnet portion;
   a strap elongated in shape and comprising a side extending along a length and width of the strap;
   wherein the side comprises a gripping feature adapted to hold the object so the object does not slip out of the strap when mounted; and
   wherein the strap comprises a closing feature that is adjustable such that the strap is able to close around and hold the object.

2. The device of claim 1 further comprising:
   a linking member configured to connect to each of the magnet portion and the strap.

3. The device of claim 2, wherein:
   the linking member is engaged in each of an aperture of the magnet portion and an aperture of the strap.

4. The device of claim 1, wherein:
   the gripping feature comprises a grid of threads.

5. The device of claim 4, wherein:
   the grid of threads comprises polypropylene and non-residual adhesive.

6. The device of claim 4, wherein:
   the grid of threads comprises silicon.

7. The device of claim 1, wherein:
   the closing feature comprises a first connection portion and a second connection portion, wherein the first connection portion and second connection portion are configured to connect to one another to cause the strap to close around and hold the object.

8. The device of claim 2, wherein:
   the linking member is further configured to allow the strap and the magnet portion to be independently movable relative to one another to allow the magnet portion to be connected to a surface facing any direction, and further allowing the container to be held in an upright position.

9. The device of claim 1 further comprising:
a handle accessory, wherein the handle accessory is configured to connect to the magnet portion.

10. The device of claim 1, wherein:
the object is a water bottle.

11. The device of claim 1, wherein:
the magnet portion is configured to support at least 30 pounds.

12. A device for mounting a container comprising:
a magnet portion;
a strap elongated in shape;
a linking member configured to connect to each of the magnet portion and the strap;
wherein the strap comprises a closing feature that is adjustable such that the strap is able to close around and hold the container; and
wherein the linking member is configured to allow a force of gravity to cause the container to be held in an upright position.

13. The device of claim 12, wherein:
the linking member is further configured to allow the strap and the magnet portion to be independently movable relative to one another.

14. The device of claim 12, wherein:
the magnet portion comprises a magnet portion aperture;
the strap comprises a strap aperture; and
wherein the linking member is engaged in each of the magnet portion aperture and the strap aperture.

15. The device of claim 12, wherein:
the closing feature comprises a first connection portion and a second connection portion, wherein the first connection portion and second connection portion are configured to connect to one another to cause the strap to close around and hold the object.

16. The device of claim 15, wherein:
the closing feature is a hook-and-loop fastener;
wherein one of the first or second connection portions comprises hooks, and the other of the first or second connection portions comprises loops.

17. The device of claim 12 further comprising:
an additional item linking member;
wherein the additional item linking member is configured to connect to each of an additional item and the strap.

18. A device for mounting a container comprising:
a magnet;
a strap elongated in shape and comprising a side extending along a length and width of the strap;
a linking member configured to connect to each of the magnet and the strap;
a handle accessory;
wherein the side comprises a gripping feature adapted to hold the container so it the container does not slip out of the strap when mounted;
wherein the strap comprises a closing feature that is adjustable such that the strap is able to close around and hold the container;
wherein the linking member is further configured to allow the strap and the magnet to be independently movable relative to one another to allow the magnet to be connected to a surface facing any direction, and further allowing the container to be held in an upright position;
wherein the magnet is configured to support at least 30 pounds;
wherein the handle accessory is configured to connect to the magnet; and
wherein the container is a water bottle.

19. The device of claim 18 wherein the gripping feature comprises a grid of threads, the grid of threads comprising polypropylene and non-residual adhesive.

* * * * *